Patented May 17, 1927.

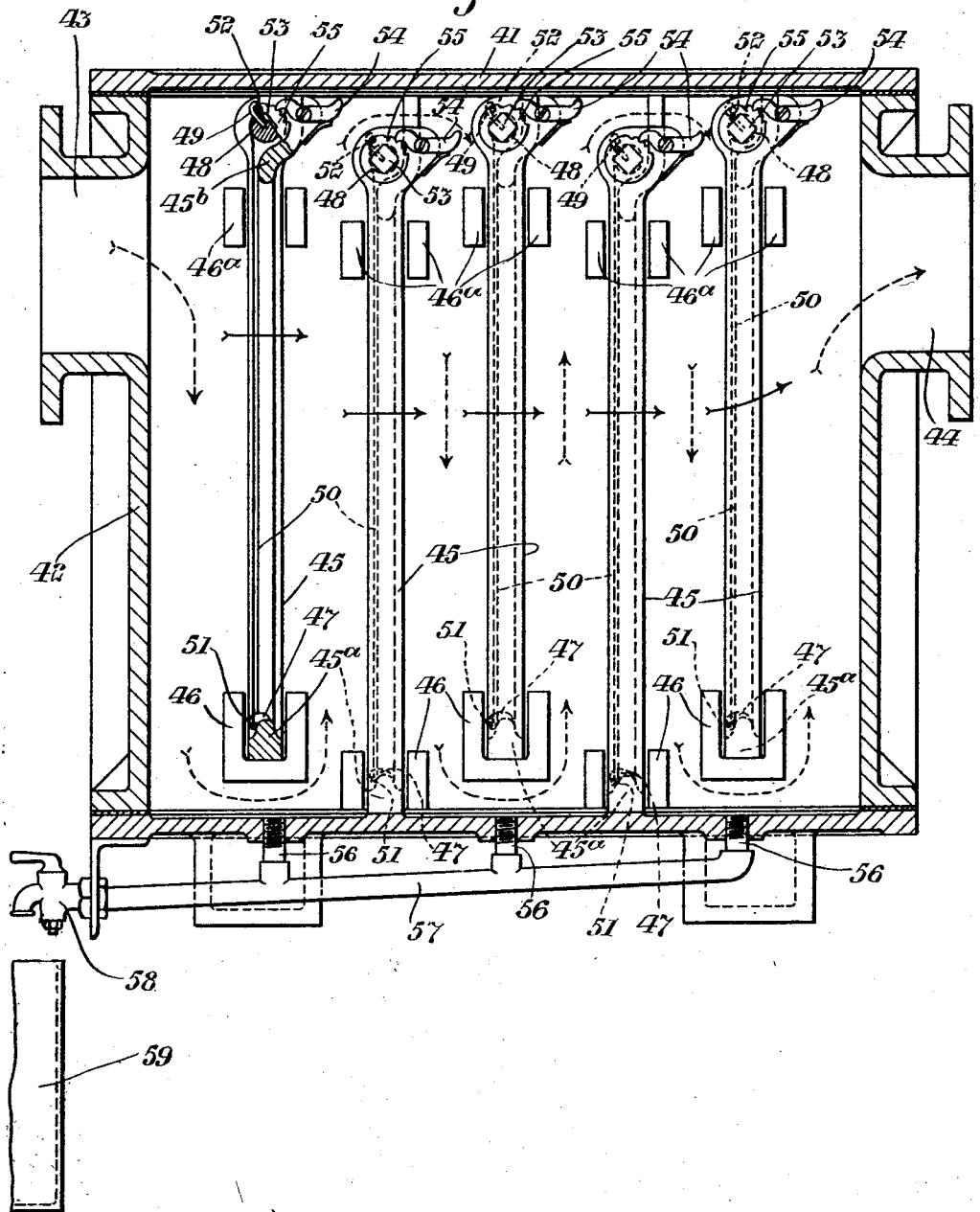

1,628,932

UNITED STATES PATENT OFFICE.

ROBERT TRAILL AND ROBERT STRACHAN, OF GLASGOW, SCOTLAND, ASSIGNORS TO THE FAIRFIELD SHIPBUILDING & ENGINEERING COMPANY, LIMITED, OF GLASGOW, SCOTLAND.

ABSTRACTION OF LUBRICATING OIL FROM THE OIL VAPOR IN CRANK CASES OF DIESEL ENGINES.

Application filed December 7, 1925, Serial No. 73,745, and in Great Britain July 11, 1925.

This invention relates to Diesel engines.

At present, in connection with marine and other large Diesel engines having forced lubrication, a considerable supply of lubricant is required and, in the working of the engine, a fog is generated which, as it escapes through the ventilation or other openings in the engine crank case, pollutes the atmosphere of the engine room and, when it condenses, it also causes oily deposits to take place on metallic and other surfaces in the room. The oily atmosphere is very disagreeable and detrimental to the health of the personnel and the greasy and slippery nature of metallic parts upon which oil deposits take place is also objectionable.

Careful observation shows that the fog is mainly composed of very fine particles of oil held in suspension in the air within the crank case although, owing to the comparatively high temperature, there is also a certain amount of oil vapor present.

We are aware it has already been proposed in connection with steam engines to provide a grease separator in the exhaust pipe so as to separate water of condensation and globules of oil from the exhaust steam, but the amount of grease involved in the separation is comparatively small and can be effected simply by placing filtering screens in the path of the volumes of steam expelled by the pumping action of the engine and subsequently separating the grease and accompanying water by gravity.

Such apparatus as heretofore proposed has not been applicable to large marine Diesel engines, which, owing to their size, the extensive use of forced lubrication, the presence of a large quantity of oil in the crank case and the continuous formation of large volumes of oil vapor or fog, require apparatus capable of dealing rapidly and effectively with the oil fog as it is generated and convey it continuously away from the crank case while abstracting the oil from the air so that the latter can be passed freely to the engine room in an unpolluted condition.

According to the present invention, we provide, in connection with engines of the Diesel type, an apparatus which is accessory to and is operated independently of the engine, and comprises means, acting either by pressure or suction, driven independently of the engine for the removal of the oil vapor or fog continuously from the crank case, means whereby the volumes of oil vapor or fog continuously being removed from the crank case are rapidly and effectively treated so as to abstract the oil therefrom, and means whereby the oil abstracted is collected whilst the clarified air is allowed to pass into the atmosphere. The independent operation of the apparatus ensures that the speed of the removal of the oil vapor, the separation of the oil and air, and the re-distribution thereof can be varied to suit the prevailing conditions thus, in the case of a marine Diesel engine, the apparatus can be kept in constant action at high speed when the ship is in warm climates and be run at reduced speed when in cold climates.

The means for removing the oil fog or vapor is preferably a "high speed" extractor fan driven by an independent motor and provided with speed control means; and the means for separating the oil from the vapor or fog may be a device acting thermally, mechanically, or by filtration.

The independent operation of the foregoing apparatus also ensures that the dual function of the pressure or suction means (which is to remove the oil fog and introduce fresh air into the crank case to keep the engine cool) is fully maintained not only when the engine is running at full speed but also when it slows down or is stopped for a time.

To increase the efficiency of the apparatus, we may employ a combined mechanical separator and filter containing filtering media and staggered relationship, whereby the oil vapor passed thereto is caused to take a zig-zag passage through the combined mechanical separator and filter casing and (or) pass through the filtering media, the air passing to the atmosphere, and the oil either being arrested within the interstices of the filtering media or being caused to settle to the bottom of the casing therefor.

In order that the invention may be clearly understood and readily carried into practice, drawings have been appended which illustrate, simply by way of example, three constructions of oil abstracting apparatus.

Fig. 3 is a sectional elevation of a filtering device for effecting the abstraction.

On the drawings the numerals wherever repeated indicate the same or similar parts.

Figure 1:
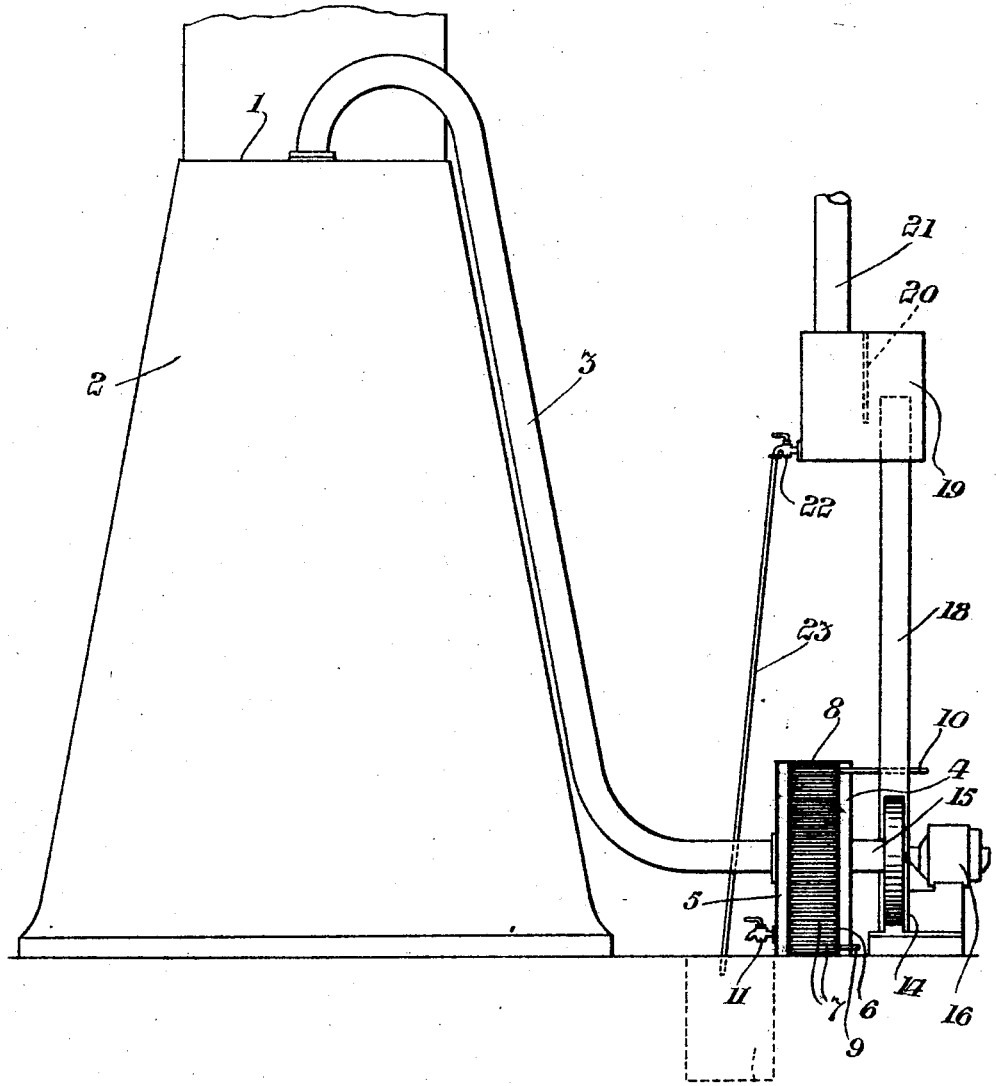
Fig. 1 is an elevation with part in section showing one form of apparatus with thermal means for effecting the abstraction.

In the apparatus as illustrated in Fig. 1, there is provided at the top 1 of the engine crank case 2 a draw-off pipe 3 through which the fog from within the engine casing is transferred to a condenser 4. This condenser (which is shown in section) may consist of two closed compartments 5, 6, one at each side, connected together by a series of tubes or other conduits 7 which extend across the central part 8 of the condenser. In the construction illustrated the vapor passes into the compartment 5 and then through the conduits 7 into the compartment 6, while a stream of cold water entering through the pipe 9 flows up through the central space around the conduits 7 and discharges itself through the outlet pipe 10. In this way the oil is condensed and collects at the bottom of the condenser from whence it can be drawn off through a tap 11, and be collected in a collecting vessel 12 indicated in dotted lines.

A suction fan 14 of any suitable type connected to the condenser by the pipe 15 serves to draw the air from the engine casing, this fan being driven by an electric motor 16.

The air, after it has been treated in the condenser, may be passed, if so desired, from the fan 14 into the vertical discharge pipe 18, which conveys it to an oil separator 19. This oil separator may be a simple receptacle having a baffle plate 20 in the centre, the discharge pipe 18 projecting into the receptacle at one side of the baffle, while an air escape pipe 21 is provided on the top of the receptacle at the opposite side of the baffle. Any particles of oil remaining in the air, after it passes the condenser, are extracted by this separator and passed, by means of the drain cock 22 and pipe 23, to the collecting vessel 12. The clarified air finally passes from the pipe 21 into the engine room or elsewhere as found desirable.

Of course, if so desired, in some cases it may be sufficient to merely use the condenser without the separator and arrange for the discharge of the clarified air as it issues from the fan 14.

Figure 2:
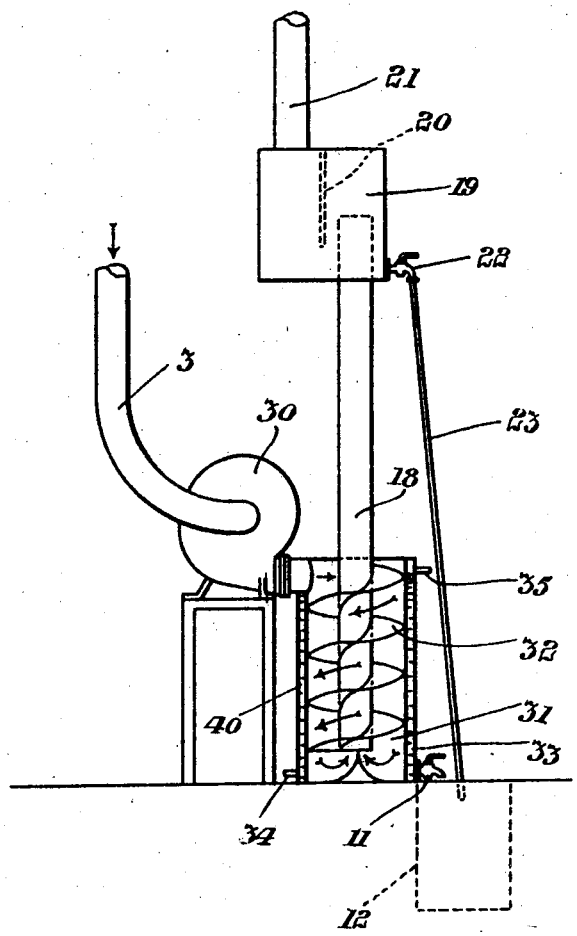
Fig. 2 is an elevation with part in section of another form of apparatus with mechanical means for effecting the abstraction.

In the construction shown in Fig. 2 the draw-off pipe 3 is connected to a centrifugal pump 30 by which the air is drawn from the engine casing and forced into the casing 31 of a mechanical separator 40 (shown partly in section) comprising a spiral member 32. Within the casing 31 is a centrally situated and open-ended discharge pipe 18, around which the spiral member is disposed, as shown, this pipe projecting into the bottom of the casing 31 so that the air must pass along the spiral member to the bottom as indicated by the arrows, and in its passage the oil is separated more or less completely from the air and drops to the bottom of the casing 31 while the air passes up the discharge pipe into a final separator 19 and is discharged in a similar manner to that in the construction shown in Fig. 1. A water jacket 33 is, or may be, provided around the casing 31, this jacket having an inlet 34 and an outlet 35 for cooling water arranged to assist the action of the separator.

If the air is discharged into the engine room it may be done directly as it is found that very little, if any, oil is left in the air after passing through the condenser or separator.

Fig. 3 shows a filtering device through which the fog from within the engine casing may be drawn or forced by means of a fan or otherwise and, by, or in, which the oil is collected, this filtering device or a number of such filtering devices can be used in lieu of the condenser 4 or the separator 40 in the apparatus shown in Fig. 1 or 2. The filtering device may comprise a metal casing 42 with a detachable top 41, said casing having an inlet 43 at one end and an outlet 44 at the other end. A number of rectangular filtering frames 45 are provided in the casing between the inlet and outlet thereof. The filtering frames rest in supporting lugs 46 at each side of the interior of the casing and are held vertical by projections 46ª. If desired, some of the frames may, as shown, rest on the bottom of the filter. Each frame may be provided with a number of fixed hooks 47 disposed in spaced positions on one side of the lower cross rail 45ª thereof and with a rotatable roller 48, carrying a series of axially spaced hooks 49, above the upper cross rail 45ᵇ. Each frame carries a filtering medium, for instance, a piece of cotton or linen cloth 50, mounted upon two cross rods or bars 51, 52, one of which rods or bars 51 detachably engages with the fixed hooks at the bottom and the other bar 52 detachably engages the hooks 49 on the roller 48, all being so arranged that the filtering medium is stretched across the frame and, by rotating the roller, can be tightened. The roller 48 is provided with a square end 53 (or with any other non-circular end) for the engagement of a tool by which it can be rotated and it is also provided with a spring pawl 54 and ratchet 55 to maintain the filtering medium in a taut condition. The whole arrangement is such that, when desired, the frames can be removed from the casing by sliding them out of the lugs 46 through the top thereof and by slackening the filtering medium, the bars 51, 52, can be detached from the hooks on the frame and roller and the filtering medium thereby removed from the frame and the oil extracted therefrom by centrifugal action or by pressure.

With this filtering device the fog is caused to pass through the filtering medium so that the oil is collected thereon as aforesaid while the air which passes through the casing and which eventually discharges through the outlet 44 may be passed to a secondary separator 40 (Figs. 1 and 2) or it may be discharged directly into the engine room or elsewhere as found desirable.

Preferably, as in the construction illustrated at Fig. 3, a number of such filtering frames are provided arranged in staggered relationship within the casing so as to act as baffles and cause the fog to follow a zig-zag passage through the casing (as shown by the dotted line arrows) and (or) pass through the filtering medium (as shown by the full line arrows). In this way the apparatus serves as a mechanical separator as well as a filter. Part of the oil will be collected on the filtering mediums as hereinbefore described and part will be collected at the bottom of the casing. The oil which collects at the bottom of the casing can be periodically drawn off through the discharge pipe 57 and tap 58 and collected in the collecting vessel 59 or can be otherwise disposed of.

In the drawings, Fig. 3, one of the frames is shown in section but the others are not sectioned.

As will be seen the frames with the filtering mediums thereon can be readily removed, the filtering mediums taken off and the oil extracted therefrom and thereafter replaced and the frames be again dropped into position.

Instead of drawing the air from the crank case by means of a fan or pump, the crank case may be entirely closed and have air at low pressure forced into it by means of a fan, pump, or otherwise, this air, carrying the fog with it, is then conveyed away by one or more pipes and treated in the manner hereinbefore described.

It will be obvious that the draw-off pipe may be connected to any part of the crank case, and that the condenser and (or) separator may be cooled by air or in any other way.

With this invention not only is a clarified atmosphere provided in the engine room but also a proportion of the lubricating oil used, and which is at present thrown off as vapor or fog and lost, is abstracted and saved for further use, thereby resulting in considerable saving in running expenses.

It is obvious the condenser, the separator, or the filter, may be constructed in various ways without departing from the invention.

Having now fully described our invention what we claim and desire to secure by Letters Patent is:—

1. In an internal combustion engine of the Diesel type, apparatus which is accessory to the engine and comprises, in combination, means operated independently of the engine for removing oil fog from the crank case continuously, a combined mechanical separator and filter containing filtering media in staggered relationship, the oil vapor being partly arrested within the interstices of the said media and partly caused to settle to the bottom of the casing therefor, means whereby the oil abstracted is collected, and means whereby the clarified air is allowed to pass into the atmosphere.

2. In an internal combustion engine of the Diesel type, apparatus which is accessory to the engine and comprises, in combination, an extractor fan operated independently of the engine for removing oil fog from the crank case continuously, a combined mechanical separator and filter containing filtering media in staggered relationship, the oil vapor being partly arrested within the interstices of the said media and partly caused to settle to the bottom of the casing therefor, a tank wherein the oil abstracted is collected, and means whereby the clarified air is allowed to escape to the atmosphere.

In testimony whereof we affix our signatures.

ROBT. TRAILL.
ROBERT STRACHAN.